March 22, 1949. J. K. DOUGLAS 2,465,212
HYDRAULIC DRIVE
Filed Jan. 21, 1946 3 Sheets-Sheet 1

INVENTOR:
JAMES K. DOUGLAS
BY Wesley R. Merrill
ATTORNEY.

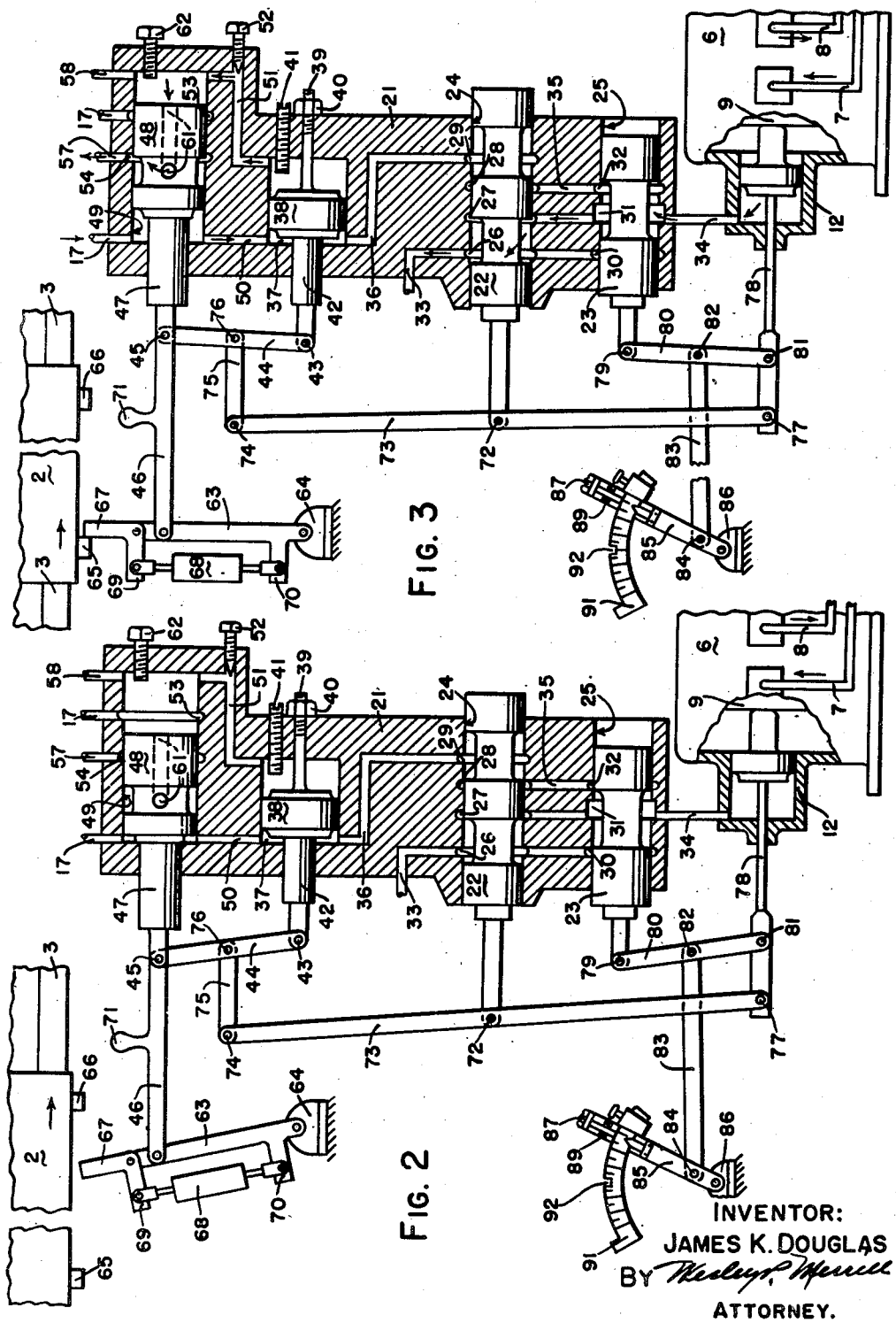

March 22, 1949.  J. K. DOUGLAS  2,465,212
HYDRAULIC DRIVE
Filed Jan. 21, 1946  3 Sheets-Sheet 3
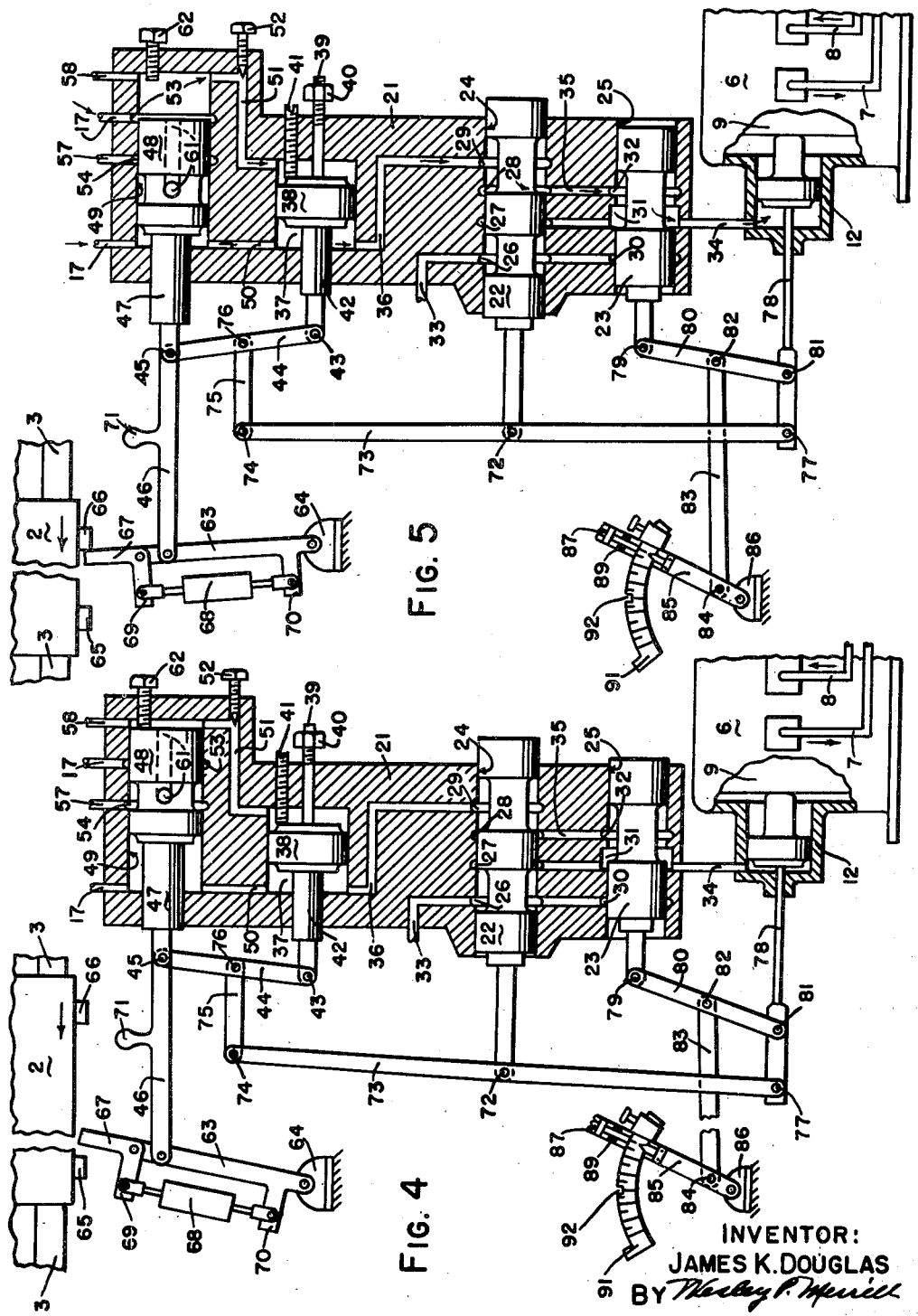
INVENTOR:
JAMES K. DOUGLAS
BY *Wesley P. Merrill*
ATTORNEY.

Patented Mar. 22, 1949

2,465,212

UNITED STATES PATENT OFFICE 2,465,212

HYDRAULIC DRIVE

James K. Douglas, Shorewood, Wis., assignor to The Oilgear Company, Milwaukee, Wis., a corporation of Wisconsin Application January 21, 1946, Serial No. 642,496

20 Claims. (Cl. 60—53)

This invention relates to hydraulic drives of the type employed to drive a machine part or other element through predetermined linear or angular distances in opposite directions alternately.

A drive constructed according to the invention is particularly adapted to drive the table of a bed planer and the invention will be explained as employed for that purpose but it is to be understood that the invention is not limited to a planer drive and that drives embodying the invention may be employed to drive machine parts or other elements which are to be reciprocated or rotated in opposite directions alternately.

A hydraulic planer drive includes a hydraulic motor for driving the table of the planer, a pump for supplying liquid to the motor to energize it, means to control the rate and direction of flow of liquid to thereby control the speed and direction of table movement and means for reversing the flow of liquid to thereby reverse the direction of table movement.

A planer driven by a prior hydraulic drive of the type usually employed does not reverse accurately but, on the contrary, its table overruns the point at which the flow of liquid is reversed and the amount of overrun varies according to the speed of the table, the overrun being seven inches or more at normal high cutting speed if the motor is of the reciprocating type, the overrun being fourteen inches or more at normal high cutting speed if the motor is of the rotary type, and the amount of overrun will increase or decrease if the table speed is increased or decreased. Also, each of the prior hydraulic drives is provided with a plurality of controls so that the operator must move his hands back and forth from one control to another in order to obtain the desired movements of the table while setting up a new piece of work.

The present invention has as an object to provide a hydraulic drive which will drive an element in opposite directions alternately and will reverse the element at the same point regardless of the speed of the element.

Another object is to provide a hydraulic drive which may be caused to move a driven element through any desired distance in either direction at any desired speed by manipulating a single control.

Another object is to provide a hydraulic drive which will drive an element in opposite directions alternately and which will gradually decelerate the driven element at the end of its movement in one direction and then gradually accelerate it in the opposite direction without permitting any dwell at the point of reversal.

Other objects and advantages will appear from the following description of the hydraulic drive shown schematically in the accompanying drawings in which the views are as follows:

Fig. 2 is a view similar to Fig. 1 but with certain parts omitted or broken away and with other parts shown in the positions occupied when the drive is moving the planer table toward the right on a cutting stroke.

Fig. 3 is a view similar to Fig. 2 but showing the parts in position to initiate reversal of the table at the end of its cutting stroke.

Fig. 4 is a view similar to Fig. 2 but showing the parts in the positions occupied when the drive is moving the table toward the left on a return stroke.

Fig. 5 is a view similar to Fig. 2 but showing the parts in position to initiate reversal of the table at the end of its return stroke.

Figure 1:
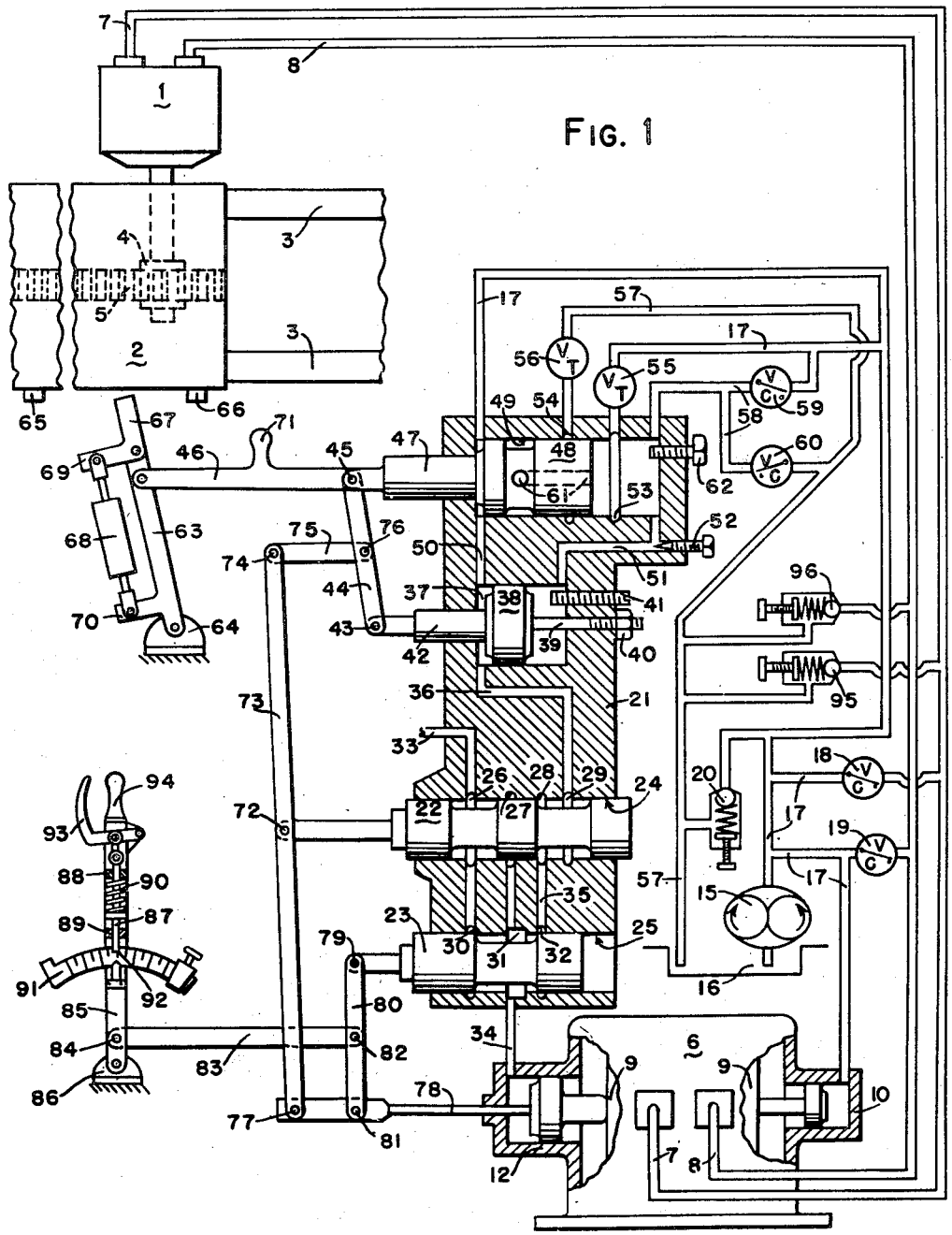
Fig. 1 is a view showing an embodiment of the invention employed to drive the table of a planer, the upper part of the figure being a plan view of a portion of the planer, the remainder of the view being in part a vertical section and in part an elevation of a schematic representation of the drive, and the parts being shown in the positions normally occupied when the drive is idle.

For the purpose of illustration, the invention has been shown embodied in a hydraulic drive which includes a rotary hydraulic motor 1 and is employed to drive a planer but the motor may be of the reciprocating type and the drive may be employed to drive any machine part or other element which is to be moved in opposite directions selectively. Since the planer forms no part of the present invention, it has been represented by a table 2 mounted upon ways 3. Motor 1 is connected to table 2 by a suitable drive which ordinarily includes a reduction gear but to simplify the drawing a pinion 4 has been shown fixed upon the shaft of motor 1 and meshing with a rack 5 which is fixed to the under side of table 2 according to the usual practice.

Liquid for energizing motor 1 is supplied thereto from a pump 6 through one or the other of two channels 7 and 8 which connect motor 1 and pump 6 into a closed hydraulic circuit. Pump 6 will deliver liquid in a direction and at a rate dependent upon the direction and distance its displacement varying member or slide block 9 is offset from its neutral position in which position of slide block 9 the displacement of pump 6 is zero and no liquid will be delivered thereby. Slide block 9 is adapted to be moved toward the left by a servo-motor 10 and it is adapted to be moved toward the right by a servo-motor 12 which has a considerably larger displacement than servo-motor 10.

Liquid for supercharging pump 6 and for energizing servo-motors 10 and 12 is supplied by a gear pump 15 which is ordinarily driven in unison with pump 6 and arranged in the casing thereof according to common practice but for the purpose of illustration it has been shown as a separate pump and as being supplied with liquid from a reservoir 16 which in practice constitutes the sump of pump 6 and is arranged in the casing thereof.

Gear pump 15 draws liquid from reservoir 16 and discharges it into a branched supply channel 17 having one branch thereof connected directly to servo-motor 10. Two other branches of channel 17 are connected to channels 7 and 8, respectively, through two check valves 18 and 19 which prevent liquid from flowing from channels 7 and 8 into channel 17 but permit gear pump 15 to deliver liquid into either channel 7 or 8 whenever the pressure therein is less than gear pump pressure, thereby keeping pump 6 supercharged. Liquid discharged by gear pump 15 in excess of requirements is exhausted through a relief valve 20 which causes gear pump 15 to create and maintain a constant low pressure in channel 17 and in all channels and chambers connected thereto.

The gear pump liquid continuously supplied to servo-motor 10 causes it to continuously urge slide block 9 toward the left but movement thereof is controlled by operation of servo-motor 12 which is also supplied with gear pump liquid under the control of a device having two pilot valves and a carry-over mechanism arranged in different planes within a casing which may be connected directly to servo-motor 12. However, in order to simplify the drawing and to clearly illustrate the functions of the device, the pilot valves and the carry-over mechanism have been shown arranged in a single plane within a valve block 21.

As shown, the flow of liquid to and from servo-motor 12 is controlled by a reversing pilot valve 22 and a stop and go pilot valve 23 which are fitted respectively, in bores 24 and 25 formed in valve block 21. Bore 24 has four annular grooves or ports 26, 27, 28 and 29 formed in the wall thereof and bore 25 has three annular grooves or ports 30, 31 and 32 formed in the wall thereof.

Ports 26 and 30 may discharge into the casing (not shown) which encloses the control device and from which liquid may be drained in any suitable manner but, for the purpose of illustration, ports 26 and 30 have been shown connected to a drain channel 33 which leads to a suitable point of disposal such as reservoir 16. Ports 27 and 31 are both connected by a channel 34 to servo-motor 12. Ports 28 and 32 are connected to each other by a channel 35. Port 29 is connected to a channel 36 which is continuously supplied with gear pump liquid as will presently be explained.

The length of the central head or piston of valve 22 has been shown as being exactly the same as the distance between the outside edges of ports 27 and 28 and the distance between the two heads or pistons of valve 23 has been shown as being exactly the same as the distance between the adjacent edges of ports 30 and 32 so that, when valves 22 and 23 are in their normal positions as shown in Fig. 2, the valves make a line-and-line seal with the ports which they control and the slightest movement of either valve in either direction will uncover a portion of one of the controlled ports.

This arrangement is satisfactory if the parts are accurately machined and assembled but only a small flow of liquid to or from servo-motor 12 is required to effect a substantial change in the displacement of pump 6. Therefore, in practice the central head of valve 22 is made longer and the heads of valve 23 are arranged closer together so that, when the valves are in their normal position as shown in Fig. 2, valve 22 overlaps the outer edges of ports 27 and 28, valve 23 overlaps the adjacent edges of ports 30 and 32 and the overlapping portions of the valves are provided with tapered slots which throttle the flow through a port when a valve is shifted. Since such slotting of valves is well-known and in extensive commercial use, it has been omitted from the drawing in order to avoid complicating the views.

Channel 36 may be connected directly to gear pump supply channel 17 but, for the purpose of illustration, it has been shown connected to the left end of a bore 37 which is formed in valve block 21 and has a piston 38 fitted therein. The tail rod 39 of piston 38 extends through the end wall of bore 37 and has a nut 40 threaded thereon to limit the movement of piston 38 toward the left. Movement of piston 38 toward the right is limited by a stop screw 41 threaded through the end wall of bore 37.

The stem 42 of piston 38 is considerably larger than tail rod 39 and it is connected by a pin 43 to one end of a lever 44 the other end of which is connected by a pin 45 to a rod 46 and to the stem 47 of a valve 48 which is fitted in a bore 49 formed in valve block 21.

The left end of bore 37 may be connected directly to channel 17 but it has been shown connected by a channel 50 to the left end of bore 49 which has channel 17 connected thereto so that the left end of bore 49, the left end of bore 37 and port 29 in valve bore 24 are continuously supplied with gear pump liquid. The right end of bore 37 is connected to the right end of bore 49 by a channel 51 having a throttle valve 52 arranged therein to limit the rate of flow therethrough.

Bore 49 has formed in the wall thereof two annular grooves or ports 53 and 54 one or the other of which is always blocked by valve 48. Port 53 is connected to a branch of supply channel 17 which has a throttle valve 55 arranged therein. Port 54 is connected through a throttle valve 56 to drain such as the interior of the casing in which the control device is arranged but for the purpose of illustration throttle valve 56 and gear pump relief valve 20 have been shown connected to a drain channel 57 which discharges into reservoir 16.

The right end of bore 49 is connected to a branched channel 58 one branch of which contains a check valve 59 and is connected to channel 17 and the other branch of which contains a check valve 60 and is connected to drain channel 57. Check valve 59 permits valve 48 when moving toward the right to eject liquid from bore 49 into channel 17 but it prevents flow from channel 17 through channel 58. Check valve 60 permits valve 48 when moving toward the left to draw liquid from reservoir 16 through channels 57 and 58 into bore 49 but it prevents flow from bore 49 through channel 58 into channel 57.

When valve 48 is in the position shown, gear pump pressure extends from channel 17 through throttle valve 55 into the right end of bore 49 and thence through channel 51 into the right end of bore 37. The left end of bores 37 and 49 are always open to gear pump pressure, as previously explained, so that both ends of piston 38 and both ends of valve 48 are subjected to gear pump pressure, and due to the displacements of stems 42 and 47, piston 38 and valve 48 are urged toward the left by gear pump pressure acting upon the differential areas thereof, the movement of valve 48 toward the left being limited in any suitable manner such as by valve 48 engaging the end wall of bore 49.

When valve 48 is moved toward the right, it first blocks port 53 and then opens port 54 to a passage 61 which extends axially through valve 48 from the right end thereof and then extends radially outward between the two heads or pistons of valve 48. Opening port 54 to passage 61 permits liquid to escape from the right ends of bores 37 and 49 through passage 61 and port 54 into drain channel 57 and thereby permits the pressure prevailing in the left ends of bores 37 and 49 to move piston 38 and valve 48 toward the right. As shown, movement of valve 48 toward the right is limited by an adjusting screw 62 which is threaded through the end wall of bore 49.

Valve 48 is adapted to be shifted in one direction or the other in response to table 2 approaching the end of its movement in one direction or the other and means are preferably provided for running table 2 beyond its normal point of reversal so that the work may be checked. This may be accomplished in any suitable manner such as by connecting valve 48 through a spring biased lost motion connection to an actuator which is movable at right angles to the path of table 2 and is operated by cams carried by table 2, the lost motion connection enabling the operator to hold valve 48 stationary while the actuator is being moved by one of the cams.

For the purpose of illustration, rod 46 has been shown pivoted to a lever 63 which is pivoted at its lower end upon a stationary bracket 64 and is adapted to be operated by two dogs 65 and 66 which are carried by table 2 in adjusted positions. Lever 63 has an actuator 67 pivoted to its upper end and arranged in the path of dogs 65 and 66. Actuator 67 is held in axial alignment with lever 63 by a caged spring 68 pivotally connected between an arm 69, which is formed upon actuator 67, and an arm 70 fixed to or formed upon lever 63.

Caged spring 68 includes a spring (not shown) which holds the relatively movable parts against positive stops (not shown) with sufficient force to maintain actuator 67 in alignment with lever 63 when it is engaged by a dog 65 or 66 but the spring will yield and permit the dog to pass over actuator 67 when valve 48 is manually held stationary such as by the operator grasping a handle 71 fixed to or formed upon rod 46.

The movements of piston 38 and valve 48 in one direction or the other causes pilot valve 22 to shift in one direction or the other from an intermediate position and causes slide block 9 to move in one direction or the other to effect reversal of pump 6, and the resultant movement of slide block 9 causes pilot valve 22 to move toward its intermediate position.

As shown, pilot valve 22 is connected by a pin 72 to a floating lever 73 intermediate the ends thereof. The upper end of lever 73 is connected by a pin 74 to one end of a link 75 the other end of which is connected by a pin 76 to lever 44 intermediate the ends thereof. The lower end of lever 73 is pivotally connected to slide block 9 such as by being connected by a pin 77 to a rod 78 which is fixed to the piston of servo-motor 12.

The drive is started and stopped by pilot valve 23 which is connected by a pin 79 to the upper end of a floating lever 80 the lower end of which is connected by a pin 81 to rod 78. Lever 80 is connected intermediate its ends by a pin 82 to one end of a link 83 having its other end connected by a pin 84 to a hand lever 85 which is pivoted upon a stationary bracket 86.

Lever 85 is preferably provided with means for locking it in its neutral position and for frictionally holding it in any other position. As shown, a detent rod 87 is slidable in two guides 88 and 89 which are carried by lever 85. Rod 87 is urged by a spring 90 toward a quadrant 91 which is arranged in a stationary position substantially in contact with lever 85 and is provided with a notch 92 into which rod 87 is urged by spring 90 when lever 85 is in neutral. The upper end of detent rod 87 is pivotally connected to the outstanding arm of a bell-crank hand grip 93 which is pivoted to lever 85 adjacent the handle 94 thereof.

To start the drive, the operator moves hand grip 93 toward handle 94 which will cause hand grip 93 to withdraw rod 87 from notch 92. The operator then swings lever 85 to an adjusted position and releases hand grip 93 to permit spring 90 to press rod 87 against the upper surface of quadrant 91 and thereby frictionally hold lever 85 in its adjusted position.

The drive is stopped by moving lever 85 to its neutral position but the operator need not determine when lever 85 reaches neutral as it is only necessary to move lever 85 toward neutral until rod 87 drops into notch 92. Also, when lever 85 is in neutral, rod 87 and notch 92 prevent the drive from being accidentally started by a body bumping against lever 85.

Operation

With the parts in the positions shown in Fig. 1 and with both pumps running, gear pump 16 will maintain a constant low pressure in channel 17 and slide block 9 will be in its neutral position so that the displacement of pump 6 will be zero and, consequently, motor 1 will be idle.

If hand lever 85 is swung toward the left from its neutral position, link 83 will move with it and cause lever 80 to pivot upon pin 81 and shift pilot valve 23 toward the left to uncover port 30 so that liquid can escape from servo-motor 12 through channel 34, valve bore 25, port 30 and channel 33 to drain, thereby permitting servo-motor 10 (which is constantly supplied with gear pump liquid) to move slide block 9 toward the left.

If hand lever 85 is swung toward the right from its neutral position, link 83 will move with it and cause lever 80 to pivot upon pin 81 and shift pilot valve 23 toward the right to uncover port 32 so that gear pump liquid can flow from channel 17 through bore 49, channel 50, bore 37, channel 36, bore 24, channel 35, port 32 and channel 34 to servo-motor 12 and cause it to move slide block 9 toward the right against the resistance of servo-motor 10 which is smaller than servo-motor 12 so that the force exerted by servo-motor 12 can move slide block 9 toward the right and cause servo-motor 10 to eject liquid into channel 17.

As shown, the adjacent edges of the two heads or pistons of pilot valve 23 are normally in alignment with the adjacent edges of ports 30 and 32 so that the slightest movement of pilot valve 23 in one direction or the other uncovers one or the other of the two ports and permits liquid to flow to or from servo-motor 12 which causes slide block 9 to start moving in response to the slightest movement of pilot valve 23 from its neutral position.

Rod 78 moves with slide block 9 and it moves the lower end of lever 80 in the same direction that the upper end thereof is moved by hand lever 85. Slide block 9 thus tends to return pilot valve 23 to its neutral position substantially as fast as hand lever 85 moves it away from its neutral position. Consequently, slide block 9 will move through a distance exactly proportional to the distance through which lever 85 is moved and at the end of that movement pilot valve 23 will be in its neutral position.

Likewise, if slide block 9 starts to move in one direction or the other from an adjusted position, rod 78 will move with it and will swing the lower end of lever 80 in the same direction. Lever 80 will pivot upon pin 82 and will shift pilot valve 23 in the opposite direction to uncover port 30 or port 32 so that liquid can escape from or flow to servo-motor 12 which will cause slide block 9 to return to its adjusted position.

Shifting slide block 9 in one direction or the other causes pump 6 to discharge liquid in a direction and at a rate determined by the direction and distance slide block 9 is shifted from its neutral position. The liquid discharged by pump 6 flows through channel 7 or 8 and causes motor 1 to drive table 2 in a direction and at a rate determined by the direction and distance slide block 9 is shifted from its neutral position. Therefore, since slide block 9 moves in a direction and through a distance determined by the direction and distance through which hand lever 85 is moved, table 2 may be moved through any desired distance in either direction at any desired speed by simply manipulating a single lever.

The drive is started, stopped and manually controlled by manipulating lever 85. When lever 85 is retained in a stationary position at the right of its neutral position, the drive will move table 2 toward the right at a rate proportional to the distance lever 85 is offset from its neutral position, it will reverse when dog 65 swings lever 63 toward the right, then it will move table 2 toward the left at a rate determined by the adjustment of screw 62, it will reverse when dog 66 swings lever 63 toward the left, and it will continue to operate in this manner until lever 85 is manually returned to its neutral position.

When the drive is employed to reciprocate the table of a planer as shown, it is ordinarily adjusted to advance the table at a speed suitable for cutting metal and to retract the table at a considerably higher speed but the operation of the drive may be more readily understood if it is at first assumed that the drive is adjusted to drive table 2 at full speed in each direction.

With the parts in the positions shown in Fig. 1 and assuming that lever 85 is moved toward the right to its maximum speed position, lever 85 will shift pilot valve 23 toward the right which will cause slide block 9 to move toward the right and to move the lower end of lever 80 with it so that pilot valve 23 is returned to its neutral position when slide block 9 reaches its full stroke position as previously explained and as shown in Fig. 2. The lower end of lever 73 will also move with slide block 9 and cause pin 72 to shift pilot valve 22 toward the right so that, when slide block 9 reaches its full stroke position, pilot valve 22 will be in its neutral position and be blocking both ports 27 and 28.

With slide block 9 in its full stroke position toward the right, pump 6 will discharge liquid at its maximum rate and this liquid will flow through channel 8 to motor 1 and cause it to drive table 2 toward the right at full speed. The liquid discharged by motor 1 will be returned to pump 6 through channel 7 and any deficiency between the volume discharged by motor 1 and the volume required by pump 6 will be made up by liquid supplied by gear pump 15 through check valve 18 so that pump 6 is supercharged at a low pressure.

As table 2 approaches the limit of its movement toward the right, dog 65 will engage actuator 67 and swing lever 63 toward the right. Lever 63 will move rod 46, valve 48 and the upper end of lever 44 toward the right and valve 48 will eject liquid from bore 49 through channel 58 and check valve 59 into channel 17.

Piston 38 will at first remain stationary and lever 44 will pivot upon pin 43 and cause link 75 to swing the upper end of lever 73 toward the right. Since at this instant slide block 9 is stationary and pilot valve 22 is in neutral, lever 73 will pivot upon pin 77 and start to shift pilot valve 22 which will instantly start to uncover port 27. As soon as a very small area of port 27 is uncovered, liquid will escape from servo-motor 12 through channel 34, port 27, bore 24, port 26 and drain channel 33 and thereby cause slide block 9 to move toward the left as previously explained. Slide block 9 will move the lower end of lever 73 toward the left substantially as fast as the upper end thereof is moved toward the right by lever 63 so that lever 73 pivots upon pin 72 and pilot valve 22 momentarily remains substantially stationary.

Moving slide block 9 toward the left reduces the displacement of pump 6 but, due to the inertia of table 2 and the inertia of its own rotating parts, motor 1 will tend to continue to rotate at nearly its previous rate and to discharge liquid faster than the liquid can enter pump 6, thereby destroying the pressure in channel 8 and creating a high pressure in channel 7. The liquid discharged by motor 1 tends to accelerate pump 6 but it cannot do so as pump 6 is prevented from overspeeding by the electric motor which drives it. Consequently, the liquid reacts upon the motor pistons and decelerates motor 1 and table 2 at substantially the same rate at which the displacement of pump 6 is reduced.

If the inertia of the moving parts should cause the pressure in channel 7 to become excessive, some liquid may escape through a high pressure relief valve 95 which has been shown connected between channel 7 and drain channel 57 but which in practice is arranged within the casing of pump 6. A similar relief valve 96 is provided to relieve excessive pressures in channel 8 and has been shown connected between channel 8 and channel 57.

Motor 1 and table 2 are decelerated at such a rate that table 2 is moving at a very slow speed when lever 63 reaches its central or dead center position at which time slide block 9 has not quite reached its neutral position so that pump 6 is delivering liquid at a very low rate sufficient to cause motor 1 to move table 2 far enough to enable dog 66 to move lever 63 toward the right past dead center.

Lever 63 moves valve 48 with it and, just after it passes dead center, valve 48 uncovers a portion of port 54 as shown in Fig. 3. Opening port 54 permits liquid to escape from the right end of bore 37 through channel 51 into the right end of bore 49 and from the right end of bore 49 through passage 61, port 54 and throttle valve 56 into drain channel 57, thereby reducing the pressure in the right ends of bores 37 and 49 and permitting the gear pump pressure in the left ends thereof to move piston 38 and valve 48 rapidly toward the right to the limits of their movements as determined by screws 41 and 62.

As piston 38 and valve 48 move toward the right, they carry lever 44, link 75 and the upper end of lever 73 with them. Since at this instant slide block 9 is moving slowly, lever 73 will pivot upon pin 77 and shift pilot valve 22 farther toward the right to uncover a greater portion of port 27 so as to permit liquid to escape from servo-motor 12 at an increased rate and thereby enable servo-motor 10 to move slide block 9 and the lower end of lever 73 toward the left substantially as fast as the upper end of lever 73 is moved toward the right by piston 38 and valve 48.

Almost as soon as piston 38 and valve 48 both reach the ends of their strokes, slide block 9 returns pilot valve 22 to its neutral position as shown in Fig. 4. Slide block 9 then stops in the position determined by the adjustment of screw 62. The distance through which slide block 9 is moved is also affected by the adjustment of screw 41 which limits the movement of piston 38 but screw 41 is initially adjusted to permit piston 38 to have sufficient movement to compensate for the distance valve 48 must move beyond its neutral position in order to open port 54. After being initially adjusted, screw 41 is retained in its adjusted position and the stroke of pump 6 is varied by adjusting screw 62.

Throttle valve 56 limits the rate at which liquid is discharged from the right end of bore 49 and thereby limits the speed of piston 38 and valve 48 in order to limit the rate of movement of slide block 9 and thereby regulate the rate at which table 2 is accelerated after being reversed at the limit of its movement toward the right. Throttle valve 55 limits the rate of flow into the right end of bore 49 and thereby limits the rate at which table 2 is accelerated after being reversed at the limit of its movement toward the left. Throttle valve 52 limits the rate of flow to and from the right end of bore 37 to prevent piston 38 from reaching the end of its stroke before valve 48 reaches the end of its stroke.

With slide block 9 in its maximum displacement position toward the left as indicated in Fig. 4, pump 6 will discharge liquid at its maximum rate and this liquid will flow through channel 7 to motor 1 and cause it to drive table 2 toward the left at full speed. The liquid discharged by motor 1 will be returned to pump 6 through channel 8 and any deficiency between the volume discharged by motor 1 and the volume required by pump 6 will be made up by liquid supplied by gear pump 15 through check valve 19 to channel 8 so that pump 6 is supercharged at a low pressure.

As table 2 approaches the limit of its movement toward the left, dog 68 will engage actuator 67 and swing lever 63 toward the left. Lever 63 will move rod 46, valve 48 and the upper end of lever 44 toward the left and valve 48 will draw liquid into bore 49 through channel 58, check valve 60 and channel 57 from reservoir 16.

Piston 38 will at first remain stationary and lever 44 will pivot upon pin 43 and cause link 75 to swing the upper end of lever 73 toward the left. Since at this instant slide block 9 is stationary and pilot valve 22 is in neutral, lever 73 will pivot upon pin 77 and start to shift pilot valve 22 which will instantly start to uncover port 28. As soon as a very small area of port 28 is uncovered, gear pump liquid will flow to servo-motor 12 and cause it to move slide block 9 toward the right as previously explained. Slide block 9 will move the lower end of lever 73 toward the right substantially as fast as the upper end thereof is moved toward the left by lever 63 so that lever 73 pivots upon pin 72 and pilot valve 22 momentarily remains substantially stationary.

Moving slide block 9 toward the right reduces the displacement of pump 6 which, as previously explained, causes motor 1 and table 2 to be decelerated at such a rate that table 2 is moving at a very slow speed when lever 63 reaches its central or dead center position at which time slide block 9 has not quite reached its neutral position so that pump 6 is delivering liquid at a very low rate sufficient to cause motor 1 to move table 2 far enough to enable dog 66 to move lever 63 past dead center. Lever 63 moves valve 48 with it and, just after it passes dead center, valve 48 uncovers a portion of port 53 as shown in Fig. 5. Opening port 53 permits gear pump liquid to flow from channel 17 through choke 55 into the right end of bore 49 and thence through channel 51 into the right end of bore 37 so that both ends of piston 38 and valve 48 are subjected to gear pump pressure. Due to the displacements of stems 42 and 47, piston 38 and valve 48 are moved rapidly toward the left to the limits of their movements by gear pump pressure acting upon the differential areas thereof.

As piston 38 and valve 48 move toward the left, they carry lever 44, link 75 and the upper end of lever 73 with them. Since at this instant slide block 9 is moving slowly, lever 73 will pivot upon pin 77 and shift pilot valve 22 farther toward the left to uncover a greater portion of port 28 so as to permit gear pump liquid to flow at an increased rate to servo-motor 12 and cause it to move slide block 9 and the lower end of lever 73 toward the right substantially as fast as the upper end of lever 73 is moved toward the left by piston 38 and valve 48. Almost as soon as piston 38 and valve 48 both reach the ends of their strokes, slide block 9 returns pilot valve 22 to its neutral position and then stops in its maximum displacement position as shown in Fig. 2.

With slide block 9 in its maximum displacement position toward the right, pump 6 will deliver liquid through channel 8 to motor 1 which will again drive table 2 toward the right. The drive will continue to operate in the above described manner until it is stopped by the operator.

If table 2 is moving toward the right, it may be stopped substantially instantaneously by quickly moving lever 85 toward the left until rod 87 drops into notch 92 at which time lever 85 is in neutral which causes slide block 9 to return to neutral substantially as fast as lever 85 is returned to neutral. If lever 85 is returned to neutral when table 2 is moving toward the left, table 2 may be quickly stopped by moving pilot valve 22 toward the left by means of handle 71 but otherwise table 2 will continue its movement until it shifts pilot valve 22 by operating lever 63. Shifting pilot valve 22 toward the left when lever 85 is in neutral causes slide block 9 to return to its neutral position and thereby stop further movement of table 2.

In the foregoing explanation, it has been assumed that lever 85 and screw 62 are so adjusted that slide block 9 goes to its maximum displacement position at each side of neutral so that motor 1 drives table 2 at full speed in each direction but table 2 is ordinarily driven at a high speed in one direction and at a low speed in the other direction.

If lever 85 is moved only a short distance toward the right from its neutral position, slide block 9 will be moved a correspondingly short distance from its neutral position and it will not be moved far enough to move pilot valve 22 to its neutral position as is the case when slide block 9 is moved to its maximum displacement position as shown in Fig. 2. Consequently, pilot valve 22 will remain at the left of its neutral position and port 28 will not be closed but port 28 being open will have no effect as port 32 is at this time closed by pilot valve 23.

With slide block 9 shifted a short distance toward the right from its neutral position, pump 6 will discharge liquid at a limited rate and this liquid will flow through channel 8 to motor 1 and cause it to drive table 2 toward the right at a speed suitable for cutting metal.

As table 2 approaches the limit of its movement toward the right, dog 65 will engage actuator 67 and swing lever 63 toward the right. Lever 63 will move rod 46, valve 48 and the upper end of lever 44 toward the right. Piston 38 will at first remain stationary and lever 44 will pivot upon pin 43 and cause link 75 to swing the upper end of lever 73 toward the right. Lever 73 will pivot upon pin 77 and shift pilot valve 22 toward the right, but pilot valve 22 will not reach its neutral position until lever 63 reaches a position corresponding to the adjusted position of lever 85. Further movement of lever 63 causes pilot valve 22 to move to the right of its neutral position and uncover port 27 so that liquid can escape from servo-motor 12 and enable servo-motor 10 to first reduce the displacement of pump 6, thereby decelerating motor 1 and table 2, and to then reverse pump 6 as previously explained.

Deceleration of motor 1 and table 2 does not begin until after lever 63 passes beyond a position corresponding to the position of lever 85. That is, the distance through which table 2 moves during deceleration is substantially proportional to the displacement of pump 6. With pump 6 at less than full stroke, deceleration prior to that time is unnecessary as table 2 is then moving at a speed comparable to the speed to which it would have been decelerated if pump 6 has been at full stroke and deceleration had begun as soon as lever 63 started to move. Table 2 is thus reversed at substantially the same point regardless of its speed.

The invention thus provides a hydraulic drive which will drive an element in opposite directions alternately at selected speeds, which will gradually and smoothly decelerate the element at a regulated rate as it approaches the end of its movement in either direction and then gradually and smoothly accelerate the element at a regulated rate in the opposite direction so that there is no dwell at the point of reversal of the element, which will reverse the element at substantially the same point regardless of the speed of the element, and which may be started, stopped, manually controlled or adjusted for automatic operation by means of a single control lever or the like.

A hydraulic drive embodying the invention may take various forms and be adapted to various uses without departing from the scope of the invention which is hereby claimed as follows.

I claim:

1. In a hydraulic drive which includes a hydraulic motor for driving an element through predetermined distances in opposite directions alternately and a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, the combination of means for initially moving said member to a predetermined position at one side of neutral to thereby cause said motor to drive said element at a predetermined speed in one direction, means including a deceleration device operable in response to said element approaching the limit of its movement for causing said member to move toward neutral and thereby decelerate said motor and said element, and means for thereafter causing said member to move to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element.

2. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, means including a deceleration device operable in response to said element approaching the limit of its movement for causing said servo-motor means to move said member toward neutral and thereby decelerate said motor and said element, and means for thereafter causing said servo-motor means to move said member to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element.

3. In a hydraulic drive which includes a hydraulic motor for driving an element through predetermined distances in opposite directions alternately and a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, the combination of means for initially moving said member to a predetermined position at one side of neutral to thereby cause said motor to drive said element at a predetermined speed in one direction, means including a deceleration device operable in response to said element approaching the limit of its movement for causing said member to move toward neutral and thereby decelerate said motor and said element, means for thereafter causing said member to move to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element, and means for controlling the rate at which said member is moved to said other side of neutral to thereby effect a gradual and smooth reversal of said element.

4. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, means including a deceleration device operable in response to said element approaching the limit of its movement for causing said servo-motor means to move said member toward neutral and thereby decelerate said motor and said element, means for thereafter causing said servo-motor means to move said member to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element, and means for controlling the rate at which said member is moved to said other side of neutral to thereby effect a gradual and smooth reversal of said element.

5. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, a pilot valve for controlling the flow of fluid to and from said servo-motor means to thereby control the movements of said member, an actuator operable in response to said element approaching the limit of its movement, a floating lever connected to said pilot valve and having one end thereof connected for movement with said actuator and the other end thereof connected for movement with said member so that said one end moves with said actuator and effects movement of said pilot valve in a direction to cause said servo-motor means to move said member toward neutral to thereby decelerate said motor and said element and said member tends to move said pilot valve in the opposite direction, and reversing means responsive to said actuator reaching a given position for continuing the movement of said one end of said lever to thereby effect reversal of said pump and the resultant reversal of said motor and said element.

6. A hydraulic mechanism according to claim 5 in which the reversing means includes a piston valve having its stem connected to said actuator so that said valve may be moved by said actuator, a piston having a stem on one end thereof, linkage pivotally connecting the stems of said piston valve and said piston to each other and to said one end of said floating lever, and means for supplying control fluid to said piston valve and said piston, said piston valve upon being moved to a given position by said actuator being effective to cause said piston valve and said piston to be shifted by said control fluid and to continue the movement of said one end of said floating lever and thereby effect reversal of said pump and the resultant reversal of said motor and said element.

7. A hydraulic mechanism according to claim 5 in which the reversing means includes a piston valve having its stem connected to said actuator so that said valve may be moved by said actuator, a piston having a stem on one end thereof, linkage pivotally connecting the stems of said piston valve and said piston to each other and to said one end of said floating lever, means for supplying control fluid to said piston valve and said piston, said piston valve upon being moved to a given position by said actuator being effective to cause said piston valve and said piston to be shifted by said control fluid and to continue the movement of said one end of said floating lever and thereby effect reversal of said pump and the resultant reversal of said motor and said element, and means for controlling the rates at which said piston valve and said piston are shifted to thereby control the rate at which said element is accelerated after being reversed.

8. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, a pilot valve for controlling the flow of fluid to and from said servo-motor means to thereby control the movements of said member, an actuator operable in response to said element approaching the limit of its movement, a floating lever connected to said pilot valve and having one end thereof connected for movement with said actuator and the other end thereof connected for movement with said member so that said one end moves with said actuator and effects movement of said pilot valve in a direction to cause said servo-motor means to move said member toward neutral to thereby decelerate said motor and said element and said member tends to move said pilot valve in the opposite direction, reversing means responsive to said actuator reaching a given position for continuing the movement of said one end of said lever to thereby effect reversal of said pump and the resultant reversal of said motor and said element, and means for controlling the rate at which said member is moved to said other side of neutral to thereby effect a gradual and smooth reversal of said element.

9. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, and fluid channels connecting said pump and said motor to each other and forming therewith a closed hydraulic circuit, the combination of means for initially moving said member to a predetermined position at one side of neutral to thereby cause said motor to drive said element at a predetermined speed in one direction, means including a deceleration device operable in response to said element approaching the limit of its movement for causing said member to move toward neutral and thereby decelerate said motor and said element, and means for thereafter causing said member to move to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element.

10. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, fluid channels connecting said pump and said motor to each other and forming therewith a closed hydraulic circuit, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, means including a deceleration device operable in response to said element approaching the limit of its movement for causing said servo-motor means to move said member toward neutral and thereby decelerate said motor and said element, and means for thereafter causing said servo-motor means to move said member to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element.

11. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, fluid channels connecting said pump and said motor to each other and forming therewith a closed hydraulic circuit, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, means including a deceleration device operable in response to said element approaching the limit of its movement for causing said servo-motor means to move said member toward neutral and thereby decelerate said motor and said element, means for thereafter causing said servo-motor means to move said member to the other side of neutral to reverse the flow of liquid and thereby effect reversal of said motor and said element, said deceleration device being effective to start movement of said member only after it reaches a position corresponding to the position of said member so that the deceleration period is proportional to the speed of said element and reversal of said element is effected at substantially the same point regardless of the speed of said element, and means for controlling the rate at which said member is moved to said other side of neutral to thereby effect a gradual and smooth reversal of said element.

12. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, fluid channels connecting said pump and said motor to each other and forming therewith a closed hydraulic circuit, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, a pilot valve for controlling the flow of fluid to and from said servo-motor means to thereby control the movements of said member, an actuator operable in response to said element approaching the limit of its movement, a floating lever connected to said pilot valve and having one end thereof connected for movement with said actuator and the other end thereof connected for movement with said member so that said one end moves with said actuator and effects movement of said pilot valve in a direction to cause said servo-motor means to move said member toward neutral to thereby decelerate said motor and said element and said member tends to move said pilot valve in the opposite direction, and reversing means responsive to said actuator reaching a given position for continuing the movement of said one end of said lever to thereby effect reversal of said pump and the resultant reversal of said motor and said element.

13. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, a pilot valve for controlling the flow of fluid to and from said servo-motor means to thereby control the movements of said member, an actuator operable in response to said element approaching the limit of its movement, a floating lever connected to said pilot valve and having one end thereof connected for movement with said actuator and the other end thereof connected for movement with said member so that said one end moves with said actuator and effects movement of said pilot valve in a direction to cause said servo-motor means to move said member toward neutral to thereby decelerate said motor and said element and said member tends to move said pilot valve in the opposite direction, and a hydraulic carry-over mechanism connected to said actuator and to said one end of said lever and adapted to continue the movement of said one end of said lever in response to said actuator reaching a given position to thereby effect reversal of said pump and the resultant reversal of said motor and said element.

14. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, fluid channels connecting said pump and said motor to each other and forming therewith a closed hydraulic circuit, servo-motor means for moving said member, and means for supplying control fluid to said servo-motor means, the combination of means for initially causing said servo-motor means to move said member to a predetermined position at one side of neutral to thereby cause said motor to drive said element at a predetermined speed in one direction, a pilot valve for controlling the flow of fluid to and from said servo-motor means to thereby control the movements of said member, an actuator operable in response to said element approaching the limit of its movement, a floating lever connected to said pilot valve and having one end thereof connected for movement with said actuator and the other end thereof connected for movement with said member so that said one end moves with said actuator and effects movement of said pilot valve in a direction to cause said servo-motor means to move said member toward neutral to thereby decelerate said motor and said element and said member tends to move said pilot valve in the opposite direction, and a hydraulic carry-over mechanism connected to said actuator and to said one end of said lever and adapted to continue the movement of said one end of said lever in response to said actuator reaching a given position to thereby effect reversal of said pump and the resultant reversal of said motor and said element.

15. A hydraulic mechanism according to claim 14 in which the carry-over mechanism includes a piston valve having its stem connected to said actuator so that said valve may be moved by said actuator, a piston having a stem on one end thereof, linkage pivotally connecting the stems of said piston valve and said piston to each other and to said one end of said floating lever, and means for supplying control fluid to said piston valve and said piston, said piston valve upon being moved to a given position by said actuator being effective to cause said piston valve and said piston to be shifted by said control fluid and to continue the movement of said one end of said floating lever and thereby effect reversal of said pump and the resultant reversal of said motor and said element.

16. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of a first pilot valve for controlling the flow of fluid to and from said servo-motor means, a second pilot valve for controlling the flow of fluid to and from said servo-motor means and controlling the supply of fluid to said first pilot valve, means including said second pilot valve and responsive to said element approaching the limit of its movement in each direction for causing said servo-motor means to reverse said pump and thereby effect reversal of said motor and said element, and manual means for shifting said first pilot valve.

17. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of a first pilot valve for controlling the flow of fluid to and from said servo-motor means, a second pilot valve for controlling the flow of fluid to and from said servo-motor means and controlling the supply of fluid to said first pilot valve, means including said second pilot valve and responsive to said element approaching the limit of its movement in each direction for causing said servo-motor means to reverse said pump and thereby effect reversal of said motor and said element, manual means for shifting said first pilot valve, and means associated with said manual means for positively holding it in a given position and for frictionally holding it in any other position.

18. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, and servo-motor means for moving said member, and means for supplying control fluid to said servo-motor means, the combination of a first pilot valve for controlling the flow of fluid to and from said servo-motor means, a second pilot valve for controlling the flow of fluid to and from said servo-motor means and controlling the supply of fluid to said first pilot valve, means including said second pilot valve and responsive to said element approaching the limit of its movement in each direction for causing said servo-motor means to reverse said pump and thereby effect reversal of said motor and said element, a lever for shifting said first pilot valve, retaining means carried by said lever, a quadrant arranged adjacent said lever and having a notch formed therein, and spring means for urging said retaining means toward said quadrant to cause it to enter said notch and positively hold said lever in a given position or to engage the surface of said quadrant and frictionally hold said lever in any other position.

19. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of a first pilot valve for controlling the flow of fluid to and from said servo-motor means, a second pilot valve for controlling the flow of fluid to and from said servo-motor means and controlling the supply of fluid to said first pilot valve, means including said second pilot valve and responsive to said element approaching the limit of its movement in each direction for causing said servo-motor means to reverse said pump and thereby effect reversal of said motor and said element, a floating lever pivoted to said first pilot valve and to said member, and a hand lever connected to said floating lever.

20. In a hydraulic drive which includes a hydraulic motor for driving an element through predetermined distances in opposite directions alternately, a pump for supplying motive liquid to said motor to energize it and having a displacement varying member movable selected distances in opposite directions from a neutral or zero displacement position to determine the direction and rate at which liquid is delivered by said pump to said motor and thereby determine the direction and rate at which said motor drives said element, servo-motor means for moving said member, and means for supplying control fluid to said servo-motor means, the combination of a first pilot valve for controlling the flow of fluid to and from said servo-motor means, a second pilot valve for controlling the flow of fluid to and from said servo-motor means and controlling the supply of fluid to said first pilot valve, means including said second pilot valve and responsive to said element approaching the limit of its movement in each direction for causing said servo-motor means to reverse said pump and thereby effect reversal of said motor and said element, a floating lever pivoted to said first pilot valve and to said member, a hand lever connected to said floating lever, retaining means carried by said lever, a quadrant arranged adjacent said lever and having a notch formed therein, and spring means for urging said retaining means toward said quadrant to cause it to enter said notch and positively hold said lever in a given position or to engage the surface of said quadrant and frictionally hold said lever in any other position.

JAMES K. DOUGLAS.

REFERENCES CITED

The following references are of record in the file of this patent:

UNITED STATES PATENTS

| Number | Name | Date |
|---|---|---|
| 1,974,138 | Ferris et al. | Sept. 18, 1934 |
| 2,234,009 | Robinson | Mar. 4, 1941 |
| 2,316,471 | Tucker | Apr. 13, 1943 |
| 2,331,046 | Robinson | Oct. 5, 1943 |